United States Patent
Ozeki et al.

(10) Patent No.: US 10,100,488 B2
(45) Date of Patent: Oct. 16, 2018

(54) FRONT LOADER, SUPPORT FRAME FOR A FRONT LOADER AND METHOD

(71) Applicant: KUBOTA CORPORATION, Osaka (JP)

(72) Inventors: Yuta Ozeki, Osaka (JP); Akihiko Mori, Osaka (JP); Masataka Takagi, Osaka (JP)

(73) Assignee: KUBOTA CORPORATION, Osaka (JP)

(*) Notice: Subject to any disclaimer, the term of this patent is extended or adjusted under 35 U.S.C. 154(b) by 114 days.

(21) Appl. No.: 15/098,848

(22) Filed: Apr. 14, 2016

(65) Prior Publication Data

US 2016/0333545 A1   Nov. 17, 2016

(30) Foreign Application Priority Data

May 14, 2015  (JP) .................. 2015-098989

(51) Int. Cl.
| | |
|---|---|
| *E02F 3/36* | (2006.01) |
| *E02F 3/34* | (2006.01) |
| *B62D 65/02* | (2006.01) |
| *E02F 9/08* | (2006.01) |
| *E02F 9/00* | (2006.01) |
| *A01D 87/00* | (2006.01) |
| *A01B 59/06* | (2006.01) |
| *E02F 3/627* | (2006.01) |

(52) U.S. Cl.
CPC .......... *E02F 3/3695* (2013.01); *A01B 59/064* (2013.01); *A01D 87/0053* (2013.01); *B62D 65/02* (2013.01); *E02F 3/34* (2013.01); *E02F 3/627* (2013.01); *E02F 9/006* (2013.01); *E02F 9/0808* (2013.01)

(58) Field of Classification Search
CPC ..................................... E02F 3/3695
See application file for complete search history.

(56) References Cited

U.S. PATENT DOCUMENTS

| | | | | |
|---|---|---|---|---|
| 3,771,241 | A | * | 11/1973 | Lindell ............... E02F 9/0841 180/419 |
| 6,386,821 | B1 | * | 5/2002 | Schneider ........... E02F 3/6273 414/686 |
| 7,001,133 | B2 | | 2/2006 | Muramoto |
| 7,445,272 | B2 | * | 11/2008 | Lee ...................... E02F 9/121 180/89.12 |

(Continued)

FOREIGN PATENT DOCUMENTS

| | | |
|---|---|---|
| EP | 0 982 440 | 10/2000 |
| JP | 2011-126325 | 6/2011 |

OTHER PUBLICATIONS

U.S. Appl. No. 10/393,381, filed Mar. 20, 2003, Muramoto.

(Continued)

*Primary Examiner* — Gerald McClain
(74) *Attorney, Agent, or Firm* — Greenblum & Bernstein, P.L.C.

(57) ABSTRACT

A support for and/or a front loader includes a first main frame fixed to one of a left and right side of a vehicle body and a second main frame fixed to the other of the left and right sides of the vehicle body. A rear end of the second main frame is positioned further forward than a rear end of the first main frame.

15 Claims, 14 Drawing Sheets

(56) References Cited

U.S. PATENT DOCUMENTS

2015/0191895 A1* 7/2015 Shimomura .......... E02F 9/0883
                                                280/830
2016/0032555 A1* 2/2016 Uchijima .............. E02F 3/3695
                                                414/686

OTHER PUBLICATIONS

U.S. Appl. No. 09/465,074, filed Dec. 16, 1999, Schneider.
EP Office Action dated Feb. 7, 2018 and issued in EP 16 16 4290.
EPO Search Report dated Sep. 29, 2016 and issued in EP 16 16 4290.

* cited by examiner

FRONT LOADER, SUPPORT FRAME FOR A FRONT LOADER AND METHOD

CROSS-REFERENCE TO RELATED APPLICATIONS

The present application claims priority under 35 U.S.C. § 119 of Japanese Application No. 2015-098989, filed on May 14, 2015, the disclosure of which is expressly incorporated by reference herein in its entirety.

BACKGROUND OF THE INVENTION

1. Field of the Invention

The present invention relates to technology for a front loader mounted on a work vehicle such as a tractor.

2. Description of Related Art

Conventional technology for a front loader mounted on a work vehicle such as a tractor is known, such as that described in Japanese Patent Laid-open Publication No. 2011-126325.

The front loader described in Japanese Patent Laid-open Publication No. 2011-126325 is mounted to a vehicle body of a tractor via a work device support portion. A left/right pair of work device support portions are provided, which are respectively fixed to left and right sides of the vehicle body. The work device support portions are configured to be left/right symmetrical.

However, typically, the vehicle body of the tractor is not configured to be left/right symmetrical. For example, an engine exhaust gas purifying device, a muffler, or the like may be provided on only one of the left and right sides of the vehicle body. In such a case, when attempting to fix the work device support portions, which are configured to be left/right symmetrical, to the vehicle body, the work device support portions are likely to interfere with the muffler or the like, and there may be difficulty in assembling the front loader.

In view of the above-noted circumstances, the present invention provides a front loader capable of being readily assembled on a vehicle body.

SUMMARY OF THE INVENTION

The present invention aims to solve the problem described above.

According to one aspect of the present invention, a front loader is provided with a first fixing frame fixed to one of a left and right side of a vehicle body; and a second fixing frame fixed to the other of the left and right sides of the vehicle body, a rear end of the second fixing frame being positioned further forward than a rear end of the first fixing frame.

According to another aspect of the present invention, the front loader further includes a support frame provided to an exterior of the second fixing frame and supporting a boom; and a coupling frame coupling the second fixing frame to the support frame. The second fixing frame includes a forward group of through-holes formed forward of the coupling frame and including a plurality of front through-holes through which are inserted bolts fixing the second fixing frame to the vehicle body; and a rear group of through-holes formed to the rear of the coupling frame and in a lower position than the forward group of through-holes, the rear group of through-holes including a plurality of rear through-holes through which are inserted bolts fixing the second fixing frame to the vehicle body.

According to another aspect of the present invention, the rear group of through-holes includes a small-diameter through-hole having a diameter smaller than the rear through-holes and formed at a position higher than at least one of the rear through-holes and forward of at least one of the rear through-holes, a stud bolt fixing the second fixing frame to the vehicle body being inserted through the small-diameter through-hole.

According to another aspect of the present invention, the rear group of through-holes is provided at a position lower than a vertical direction center of the coupling frame.

According to another aspect of the present invention, the first fixing frame includes a first front plate-shaped portion formed in a plate shape generally perpendicular to a left/right direction; and a first rear plate-shaped portion provided to the rear of the first front plate-shaped portion and formed in a plate shape generally perpendicular to the left/right direction, the first rear plate-shaped portion being provided at a position shifted further outward than the first front plate-shaped portion by a first predetermined width. The second fixing frame includes a second front plate-shaped portion formed in a plate shape generally perpendicular to the left/right direction; and a second rear plate-shaped portion provided to the rear of the second front plate-shaped portion and formed in a plate shape generally perpendicular to the left/right direction, the second rear plate-shaped portion being provided at a position shifted further outward than the second front plate-shaped portion by a second predetermined width, which is larger than the first predetermined width.

According to another aspect of the present invention, the front loader further includes an indirect member which, when the second fixing frame is fixed to the vehicle body, fills a gap between the second fixing frame and the vehicle body.

Effects of the present invention are as follows.

The front loader can be readily assembled on the vehicle body because, by positioning the rear end of the second fixing frame further forward than the rear end of the first fixing frame, interference with a member provided to a side portion of the vehicle body can be avoided.

The front loader can be readily assembled on the vehicle body. Specifically, in some cases the coupling frame or the like may present an obstacle and the work of tightening the bolts may be difficult to perform to the rear of the coupling frame. By providing the rear group of through-holes at a lower position than the forward group of through-holes, interference with the coupling frame or the like is readily avoided and the work of tightening the bolts can be facilitated.

The front loader can be readily assembled on the vehicle body because positioning of the front loader with respect to the vehicle body can be facilitated using the stud bolt. In addition, because the stud bolt typically has a lower strength than an ordinary bolt, by providing the small-diameter through-hole at a position in the rear group of through-holes other than a lower extremity and rear extremity, a reduction in attachment strength of the front loader can be inhibited.

The front loader can be readily assembled on the vehicle body because, by providing the rear group of through-holes at a lower position than the vertical direction center of the coupling frame, interference with the coupling frame or the like can be more readily avoided and the work of tightening the bolts can be facilitated.

The front loader can be readily assembled on the vehicle body because, in a case where the second rear plate-shaped portion is fixed to the vehicle body via another member, a space in which the other member is arranged can be ensured between the second rear plate-shaped portion and the vehicle body. Accordingly, the second fixing frame can be attached to the vehicle body via an appropriate other member in view of the shape or the like of the second fixing frame and the vehicle body.

The front loader can be readily assembled on the vehicle body because the second fixing frame can be appropriately mounted to the vehicle body by utilizing an appropriate indirect member in view of the shape or the like of the second fixing frame and the vehicle body.

In embodiments, the invention also relates to a front loader comprising a first fixing frame fixed to a first side of a vehicle body and a second fixing frame fixed to a second side of the vehicle body, wherein a rear end of the second fixing frame is positioned further forward than a rear end of the first fixing frame.

In embodiments, the front loader may further comprise a first support frame configured to supporting a boom. The first support frame is located on an exterior side of the first fixing frame. A first coupling frame couples the first fixing frame to the first support frame. The first fixing frame comprises a forward group of through-holes located forward of the coupling frame and being configured to receive bolts adapted to fix the first fixing frame to the vehicle body and a rear group of through-holes located rearward of the coupling frame and in a lower position than the forward group of through-holes, the rear group of through-holes configured to receive bolts adapted to fix the first fixing frame to the vehicle body.

In embodiments, the front loader may further comprise a second support frame configured to supporting a boom. The second support frame is located on an exterior side of the second fixing frame. A second coupling frame couples the second fixing frame to the second support frame. The second fixing frame comprises a forward group of through-holes located forward of the second coupling frame and being configured to receive bolts adapted to fix the second fixing frame to the vehicle body and a rear group of through-holes located rearward of the second coupling frame and in a lower position than the forward group of through-holes, the rear group of through-holes configured to receive bolts adapted to fix the second fixing frame to the vehicle body.

In embodiments, the rear group of through-holes is located at a position lower than a vertical direction center axis of the second coupling frame.

In embodiments, the rear group of through-holes includes a smaller-diameter through-hole having a diameter smaller than other of the rear through-holes and being located at a position higher than at least one of the other rear through-holes and forward of at least one of the other rear through-holes, said smaller-diameter through-hole being configured to receive therein a stud bolt adapted to fix the second fixing frame to the vehicle body.

In embodiments, the rear group of through-holes is located at a position lower than a vertical direction center axis of the second coupling frame.

In embodiments, the first fixing frame comprises a front plate-shaped portion having a surface oriented generally perpendicular to a left/right direction of the vehicle body and a rear plate-shaped portion located rearward of the front plate-shaped portion and having a surface oriented generally perpendicular to the left/right direction, wherein the rear plate-shaped portion is shifted further outward than the front plate-shaped portion by a first predetermined width.

In embodiments, the second fixing frame comprises a front plate-shaped portion having a surface oriented generally perpendicular to a left/right direction of the vehicle body and a rear plate-shaped portion located rearward of the front plate-shaped portion and having a surface oriented generally perpendicular to the left/right direction, wherein the rear plate-shaped portion is shifted further outward than the front plate-shaped portion by a first predetermined width.

In embodiments, the first fixing frame comprises a front plate-shaped portion having a surface oriented generally perpendicular to a left/right direction of the vehicle body and a rear plate-shaped portion located rearward of the front plate-shaped portion and having a surface oriented generally perpendicular to the left/right direction, wherein the rear plate-shaped portion is shifted further outward than the front plate-shaped portion by a first predetermined width and the second fixing frame comprises a front plate-shaped portion having a surface oriented generally perpendicular to a left/right direction of the vehicle body and a rear plate-shaped portion located rearward of the front plate-shaped portion and having a surface oriented generally perpendicular to the left/right direction, wherein the rear plate-shaped portion is shifted further outward than the front plate-shaped portion by a second predetermined width that is greater than the first predetermined width.

In embodiments, the front loader may further comprise an indirect frame member configured to connect the rear end of the second fixing frame to one of a transmission case and the vehicle body.

In embodiments, the invention is directed to a vehicle mountable support structure for a front loader, comprising a first fixing frame removably fixable to a first side of a vehicle body and comprising a front connecting portion and at least one of an inclined portion and an side-outwardly shifted rear connecting portion. A second fixing frame is removably fixable to a second side of a vehicle body and comprises a front connecting portion and at least one of an inclined portion and an side-outwardly shifted rear connecting portion. A rear end of the second fixing frame is located further forward than a rear end of the first fixing frame.

In embodiments, the support structure may further comprise an indirect frame member configured to connect the rear connecting portion of the second fixing frame to one of a transmission case and the vehicle body.

In embodiments, the first fixing frame is fixed to a first support frame and the second fixing frame is fixed to a second support frame.

In embodiments, the invention relates to a method of installing the support structure as described herein on a vehicle body, wherein the method comprises connecting the front connecting portions to the vehicle body and connecting the rear connecting portions to at least one of an indirect frame member, a transmission case, and the vehicle body.

In embodiments, the invention is directed to vehicle mountable support structure for a front loader, comprising a first main frame comprising a first fixing frame fixable to a first side of a vehicle body and comprising a front connecting portion and an side-outwardly shifted rear connecting portion, a first support frame connectable to a boom, and a first coupling frame connecting the first fixing frame to the first support frame. A second main frame comprises a second fixing frame fixable to a second side of a vehicle body and comprising a front connecting portion and an side-outwardly shifted rear connecting portion, a second support frame connectable to a boom, and a second coupling frame connecting the second fixing frame to the second support frame. A rear end of the second fixing frame is located further forward than a rear end of the first fixing frame.

In embodiments, the support structure may further comprise an indirect frame member configured to connect the rear connecting portion of the second fixing frame to one of a transmission case and the vehicle body.

In embodiments, the invention is director to a method of installing the support structure as described herein on a vehicle body, wherein the method comprises connecting the front connecting portions to the vehicle body and connecting the rear connecting portions to at least one of an indirect frame member, a transmission case, and the vehicle body

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
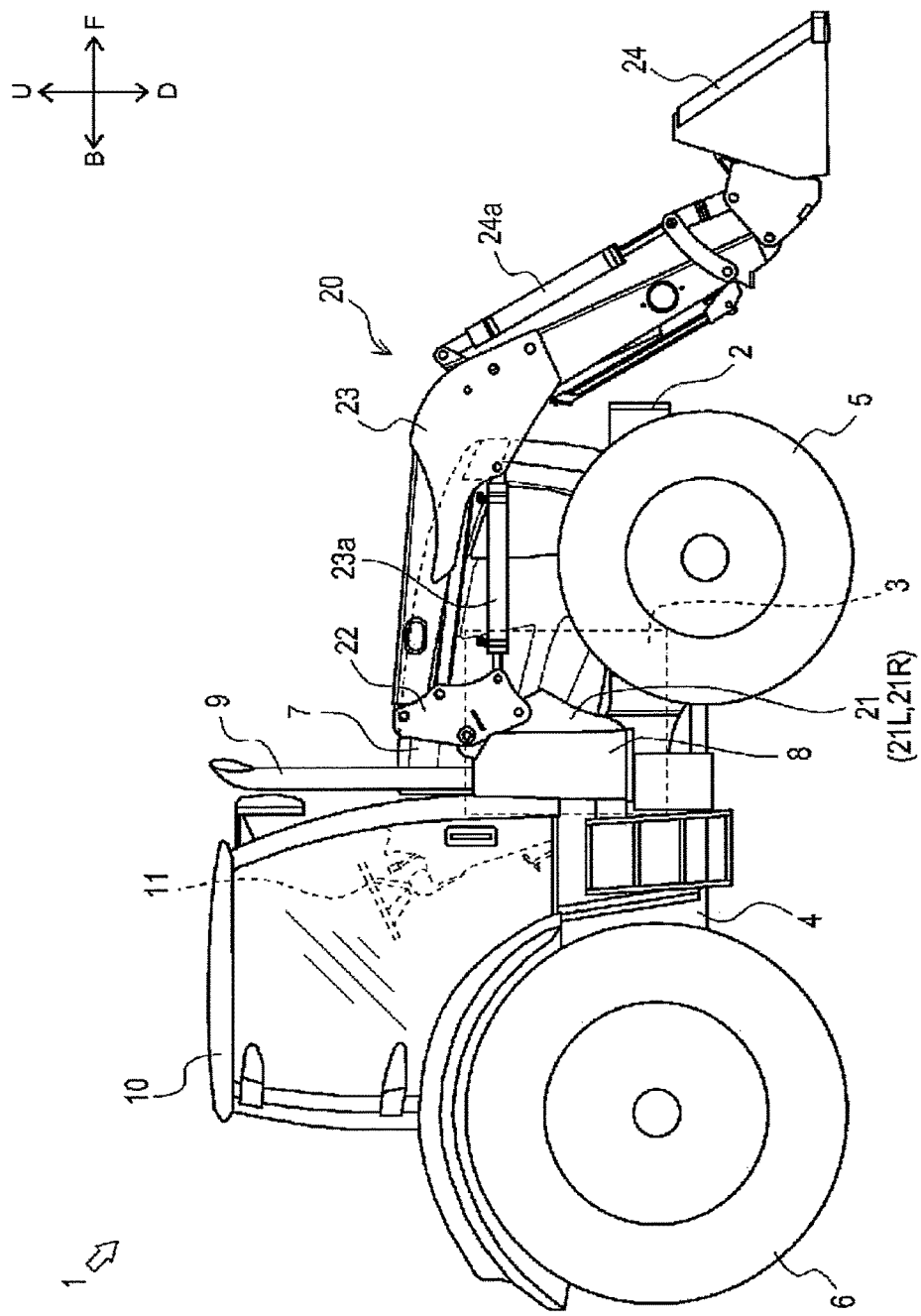
FIG. 1 is a side view of an overall configuration of a tractor to which a front loader according to a first embodiment of the present invention is mounted.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In the following, directions indicated in the drawings by arrows U, D, F, B, L, and R shall be defined in the description as an upward direction, a downward direction, a forward (front) direction, a rearward (back) direction, a left direction, and a right direction, respectively.

Figure 2:
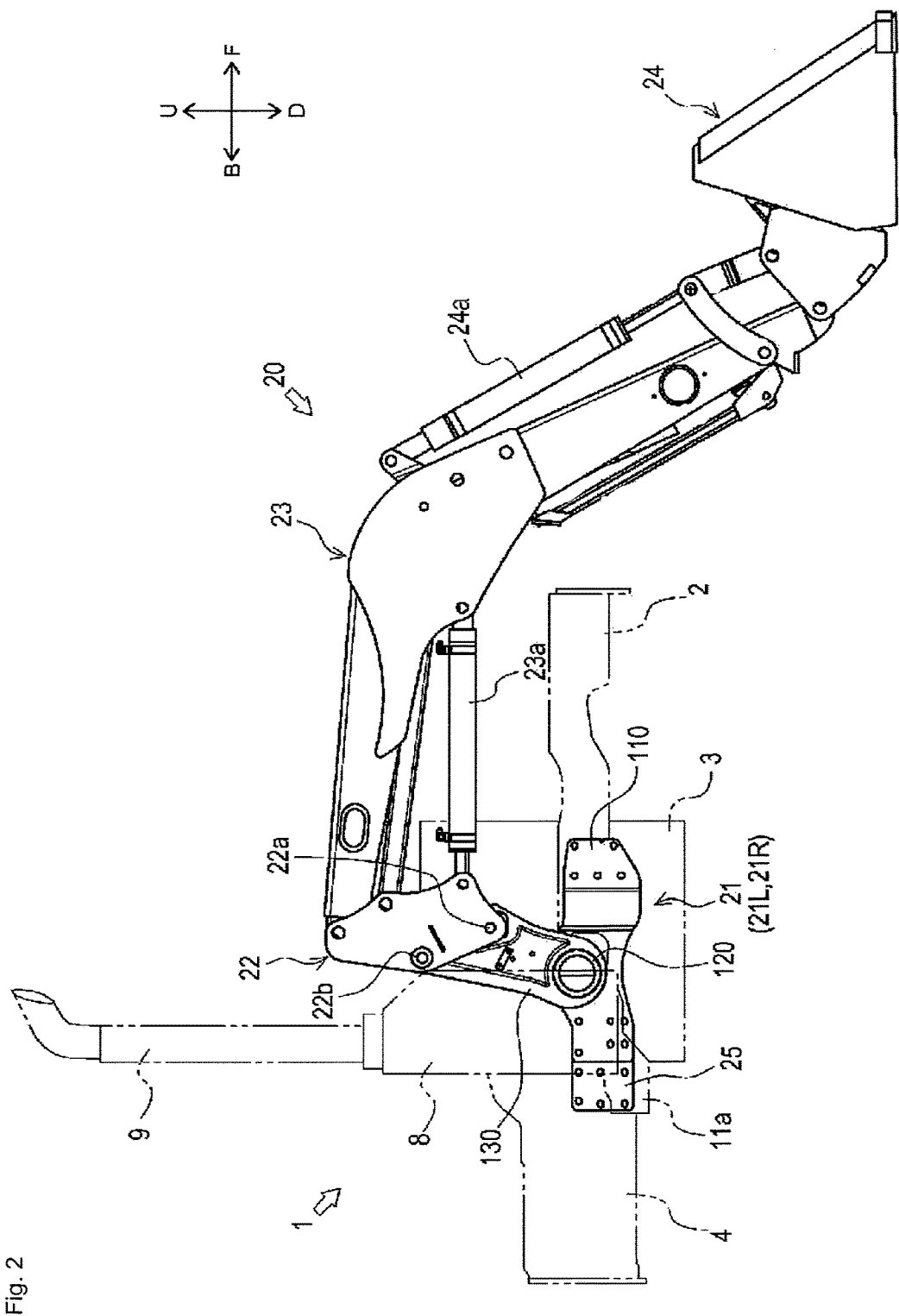
FIG. 2 is a side view of the front loader attached to an exemplary vehicle frame.
Figure 3:
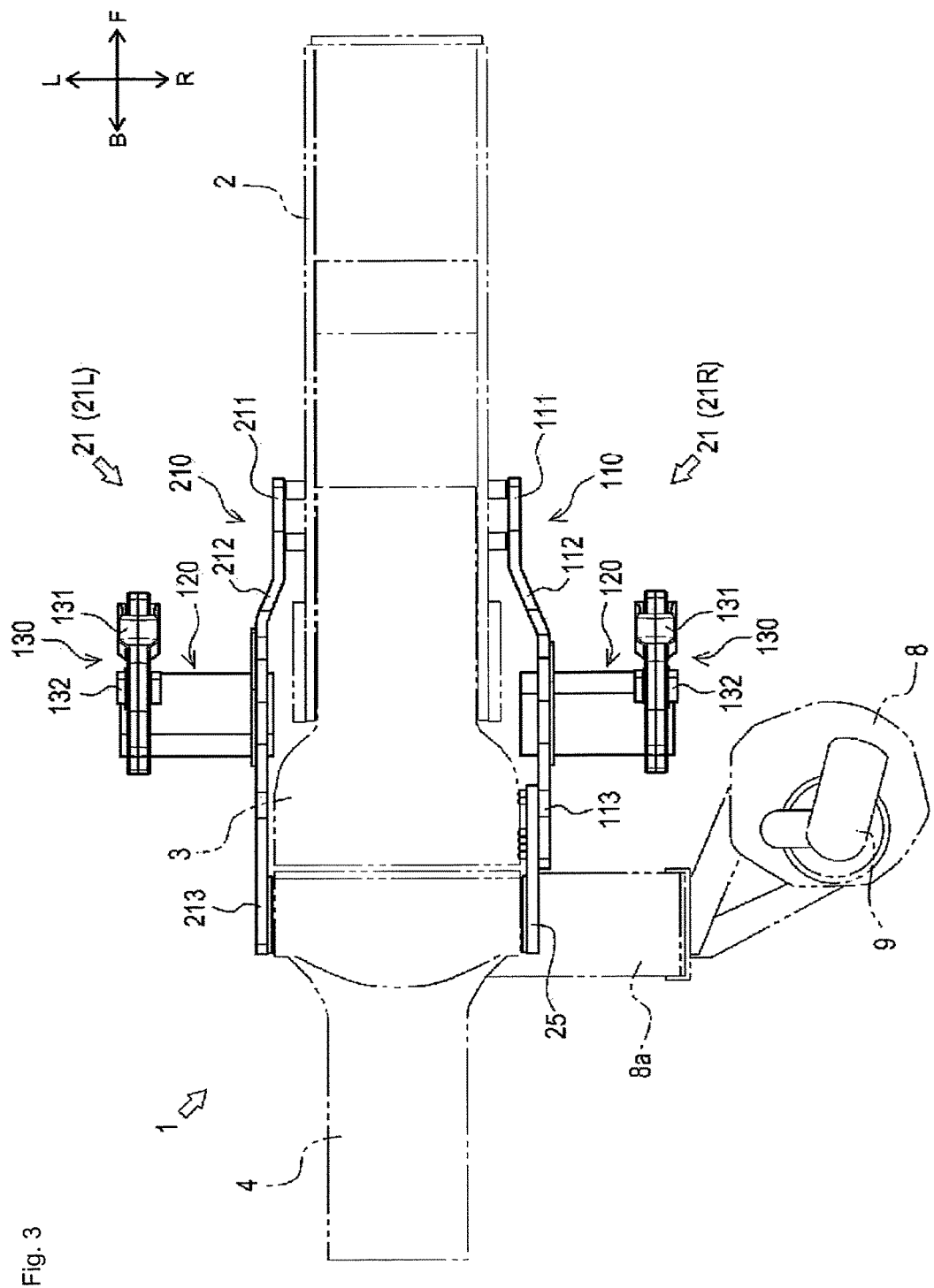
FIG. 3 is a plan view of the same.

First, an overall configuration of a vehicle body 1 of a tractor provided with a front loader 20 according to a first embodiment of the present invention is described with reference to FIGS. 1 to 3.

The tractor is primarily equipped with a vehicle frame 2, an engine 3, a transmission case 4, front wheels 5, rear wheels 6, a hood 7, an SCR (Selective Catalytic Reduction system) 8, a muffler 9, a cabin 10, a steering wheel 11, and the front loader 20.

The vehicle frame 2 is a frame-shaped member formed by appropriate combination of a plurality of plates. The vehicle frame 2 is formed in a substantially rectangular shape in plan or top view. The vehicle frame 2 is arranged at a front area or portion of the vehicle body 1 so that a longitudinal direction of the vehicle frame 2 is generally oriented in a front/back direction. The engine 3 is fixed to a rear portion of the vehicle frame 2. The transmission case 4 is fixed to a rear portion of the engine 3. A front portion of the vehicle frame 2 is supported by the left/right pair of front wheels 5 via a front axle mechanism (not shown in the drawings). A rear portion of the transmission case 4 is supported by the left/right pair of rear wheels 6 via a rear axle mechanism (not shown in the drawings). The engine 3 is covered by the hood 7.

The SCR 8, which purifies exhaust gas from the engine 3, is located on the right of the hood 7. The muffler 9, which exhausts the exhaust gas from the engine 3, is provided to a top portion of the SCR 8. The SCR 8 and the muffler 9 are fixed to the transmission case 4.

A speed or drive power of the engine 3 is changed by a speed change apparatus (not shown in the drawings) housed in the transmission case 4, after which the drive power can be transmitted to the front wheels 5 via a front axle mechanism and also transmitted to the rear wheels 6 via a rear axle mechanism. The front wheels 5 and the rear wheels 6 are rotationally driven by the drive power of the engine 3, and this enables the tractor to travel.

The cabin 10 is provided rearward of the engine 3. A living space which a driver gets into is formed in an interior of the cabin 10. The steering wheel 11, which adjusts a turning angle of the front wheels 5; as well as various operation tools (not shown); a driver's seat (not shown) on which the driver sits, and the like are arranged in the living space.

The front loader 20 is mounted on a front portion of the vehicle body 1. The front loader 20 is primarily equipped with a pair of left/right main frames 21, a pair of left/right brackets 22, a pair of left/right booms 23, a bucket 24, and an indirect frame 25.

The main frames 21 are fixed to the left and right sides, respectively, of the vehicle body 1 (vehicle frame 2 and transmission case 4). During this installation, the right-side main frame 21 (hereafter referred to as main frame 21R) is fixed to the transmission case 4 via the indirect frame 25, which has substantially a rectangular plate shape. The booms 23 are pivotably or pivotally supported on top portions of the left and right main frames 21, respectively, via the brackets 22. The booms 23 are arranged so as to extend forward and downward from the top portions of the main frames 21. The bucket 24 is pivotably coupled to a front end portion of the booms 23. The booms 23 can be pivoted with respect to the brackets 22 by extending/contracting a boom cylinder 23a. The bucket 24 can be pivoted with respect to the booms 23 by extending/contracting a bucket cylinder 24a. In this way, work such as transportation of soil/sand can be performed while appropriately pivoting the booms 23 and the bucket 24.

A detailed configuration of the main frames 21 is now described using FIGS. 2 through 8. In the following, the main frame 21 positioned on the right in the pair of left/right main frames 21 is designated the main frame 21R, while the main frame 21 positioned on the left is designated a main frame 21L. First, a configuration of the main frame 21R is described using FIGS. 2 through 7.

The main frame 21R supports the boom 23 via the bracket 22. The main frame 21R is primarily equipped with a fixing frame 110, a coupling frame 120, and a support frame 130.

The fixing frame 110 is fixed to the vehicle body 1. The fixing frame 110 is primarily equipped with a front plate-shaped portion 111, an inclined portion 112, a rear plate-shaped portion 113, a forward group of through-holes 114, and a rear group of through-holes 115.

The front plate-shaped portion 111 forms a front portion of the fixing frame 110. The front plate-shaped portion 111 is formed in a plate shape generally perpendicular to a left/right direction.

The inclined portion 112 forms a midway portion in a front/back direction of the fixing frame 110. The inclined portion 112 is formed in a plate shape extending to the right and rearward from a rear end of the front plate-shaped portion 111. The inclined portion 112 is formed so as to incline by a predetermined angle A 1 with respect to the front/back direction (see FIG. 7).

The rear plate-shaped portion 113 forms a rear portion of the fixing frame 110. The rear plate-shaped portion 113 is formed so as to extend rearward from a rear end of the inclined portion 112. In other words, the rear plate-shaped portion 113 is formed so as to be generally perpendicular to the left/right direction (parallel to the front plate-shaped portion 111). A midway portion in the front/back direction of the rear plate-shaped portion 113 (area near the front end) is formed so as to project upward in a side view.

The front plate-shaped portion 111, the inclined portion 112, and the rear plate-shaped portion 113 are integrally formed by appropriately bending a single sheet of a plate material. The inclined portion 112 is inclined with respect to the front/back direction, and therefore the rear plate-shaped portion 113 is arranged at a position shifted outward (to the right) by a width W1 with respect to the front plate-shaped portion 111 (see FIG. 7).

The forward group of through-holes 114 is provided with a plurality of front through-holes 114a. The front through-holes 114a are circular holes formed so as to pass through the fixing frame 110 in the left/right direction. Five of the front through-holes 114a are formed at an appropriate interval from each other on a front portion of the fixing frame 110 (front plate-shaped portion 111). Bolts fixing the fixing frame 110 to the vehicle frame 2 are inserted through the front through-holes 114a.

The rear group of through-holes 115 is provided with a plurality of rear through-holes 115a and a small-diameter through-hole 115b. The rear through-holes 115a are circular holes formed so as to pass through the fixing frame 110 in the left/right direction. An inner diameter of the rear through-holes 115a is formed so as to be identical to the inner diameter of the front through-holes 114a. Five of the rear through-holes 115a are formed at an appropriate interval from each other on a rear portion of the fixing frame 110 (rear portion of the rear plate-shaped portion 113). Bolts fixing the fixing frame 110 to the indirect frame 25 are inserted through the rear through-holes 115a.

The small-diameter through-hole 115b is a circular hole formed so as to pass through the fixing frame 110 in the left/right direction. An inner diameter of the small-diameter through-hole 115b is formed so as to be slightly smaller than the inner diameter of the rear through-holes 115a. The small-diameter through-hole 115b is formed at a rear portion of the rear plate-shaped portion 113. The small-diameter through-hole 115b is formed above at least one of the rear through-holes 115a. The small-diameter through-hole 115b is formed forward of at least one of the rear through-holes 115a. A stud bolt fixing the fixing frame 110 to the indirect frame 25 is inserted through the small-diameter through-hole 115b.

In this way, the small-diameter through-hole 115b, through which the stud bolt is inserted, is arranged so as to avoid a rear extremity and bottom extremity of the rear group of through-holes 115. Accordingly, it is possible to prevent an excessive load from being applied to the stud bolt, which is less strong as compared to an ordinary bolt.

The coupling frame 120 couples the fixing frame 110 with the support frame 130, which is described below. The coupling frame 120 is formed in a substantially cylindrical shape having an axis line generally oriented in the left/right direction. A left end of the coupling frame 120 is inserted through the fixing frame 110 and is fixed, as appropriate, to the fixing frame 110. More specifically, the left end of the coupling frame 120 is inserted through a top front portion of the rear plate-shaped portion 113, and is fixed to the rear plate-shaped portion 113 by welding.

The support frames 130 support the booms 23 via the brackets 22. The support frames 130 are formed in a plate shape generally perpendicular to the left/right direction. The support frames 130 are arranged so that a longitudinal direction thereof is generally oriented in a vertical direction. A right end of the coupling frame 120 is inserted through a bottom portion of the support frame 130, and the support frame 130 and coupling frame 120 are fixed together by welding. A support groove 131 and a boss portion 132 are formed on the support frame 130.

The support groove 131 is formed at a midway portion in the vertical direction of the support frame 130. The support groove 131 is formed in a shape that is open upwards (a "U" shape in a side view).

The boss portion 132 is formed at a top portion of the support frame 130 (above and behind the support groove 131). The boss portion 132 is formed in a substantially cylindrical shape having an axis line generally oriented in the left/right direction.

Figure 6:
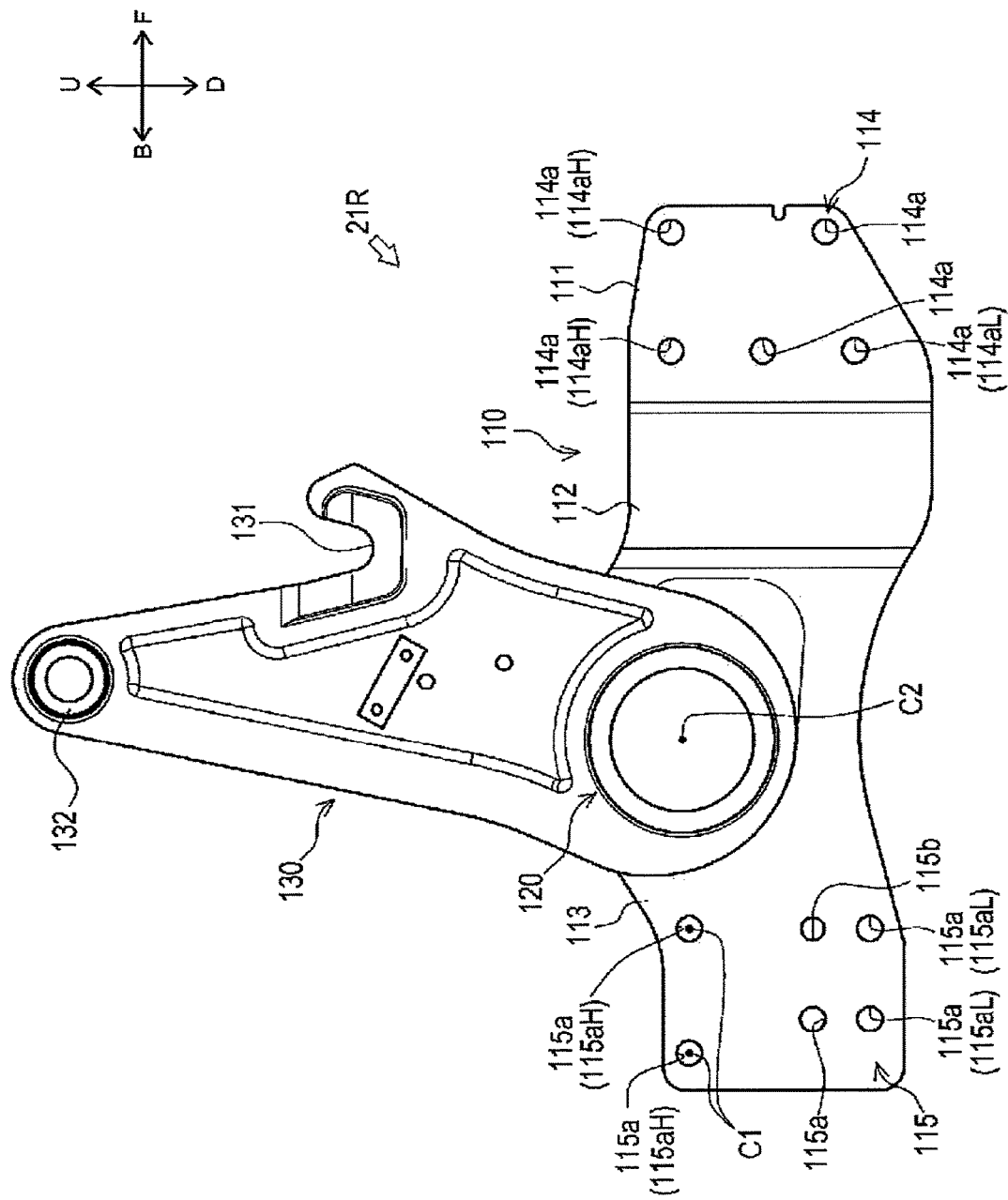
FIG. 6 is a side view of the same.

Next, with reference to FIG. 6, positioning of the rear group of through-holes 115 of the main frame 21R having the above-noted configuration is described in greater detail.

The rear group of through-holes 115 is provided at a position lower than the forward group of through-holes 114. Specifically, when the rear through-hole 115a provided at the highest position among the rear through-holes 115a (rear through-hole 115aH in FIG. 6) is compared with the front through-hole 114a provided at the highest position among the front through-holes 114a (front through-hole 114aH in FIG. 6), the rear through-hole 115aH is provided at a position lower than the front through-hole 114aH.

In addition, when the rear through-hole 115a provided at the lowest position among the rear through-holes 115a (rear through-hole 115aL in FIG. 6) is compared with the front through-hole 114a provided at the lowest position among the front through-holes 114a (front through-hole 114aL in FIG. 6), the rear through-hole 115aL is provided at a position lower than the front through-hole 114aL.

In this way, a range in which the rear group of through-holes 115 is formed (vertical direction range) is situated at a position lower than the range in which the forward group of through-holes 114 is formed.

Moreover, the rear group of through-holes 115 is provided at a position lower than a center (vertical direction center) of the coupling frame 120. Specifically, when a center C1 of the rear through-hole 115aH (see FIG. 6) is compared with a center C2 of the coupling frame 120, the center C1 of the rear through-hole 115aH is provided at a position lower than the center C2 of the coupling frame 120.

Figure 7:
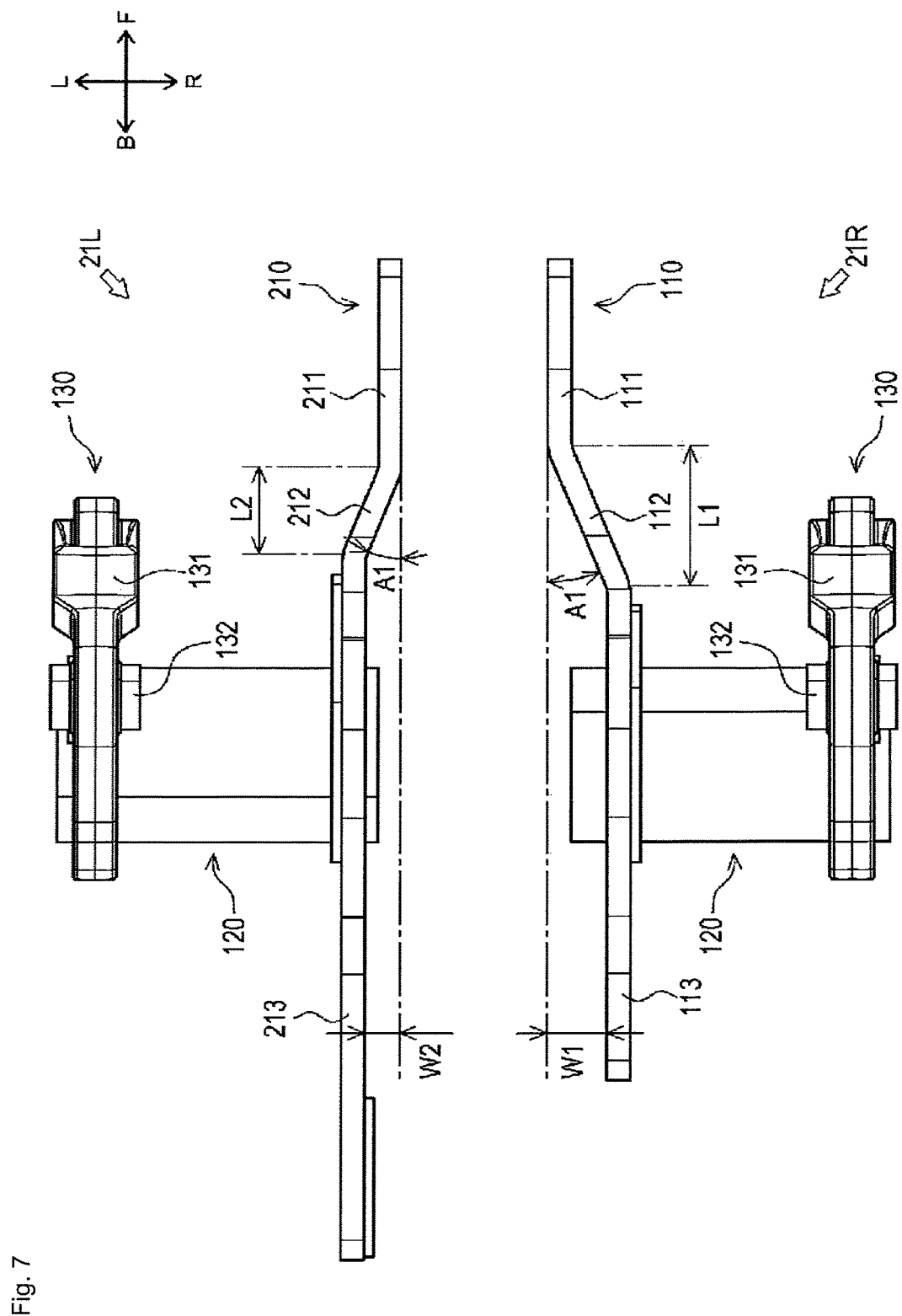
FIG. 7 is a plan view of left and right main frames.
Figure 8:
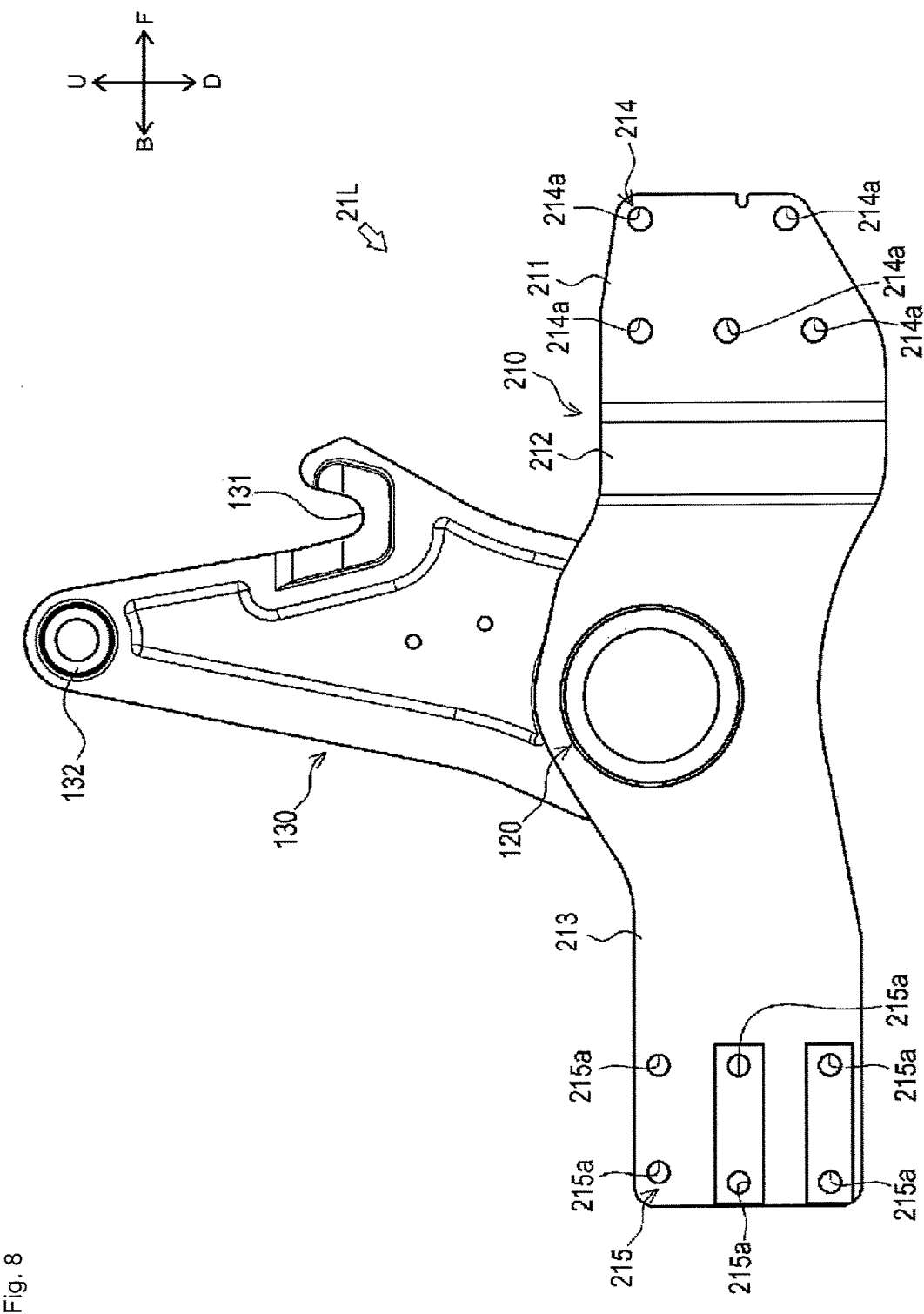
FIG. 8 is a side view of the main frame on the left side.

Next, a configuration of the main frame 21L positioned on the left of the pair of left/right main frames 21 is described with reference to FIGS. 7 and 8.

The main frame 21L supports the boom 23 via the bracket 22. The main frame 21L is primarily equipped with a fixing frame 210, the coupling frame 120, and the support frame 130. Because the coupling frame 120 and the support frame 130 of the main frame 21L are left/right symmetrical to the coupling frame 120 and the support frame 130 of the main frame 21R, descriptions thereof are omitted.

The fixing frame 210 is fixed to the vehicle body 1. The fixing frame 210 is primarily equipped with a front plate-shaped portion 211, an inclined portion 212, a rear plate-shaped portion 213, a forward group of through-holes 214, and a rear group of through-holes 215.

The front plate-shaped portion 211 forms a front portion of the fixing frame 210. The front plate-shaped portion 211 is formed in a plate shape generally perpendicular to the left/right direction. A front/back direction length of the front plate-shaped portion 211 is configured to be slightly longer than the front/back direction length of the front plate-shaped portion 111 of the main frame 21R.

The inclined portion 212 forms a midway portion in the front/back direction of the fixing frame 210. The inclined portion 212 is formed in a plate shape extending to the left and rearward from a rear end of the front plate-shaped portion 211. The inclined portion 212 is formed so as to incline by the predetermined angle Al with respect to the front/back direction (see FIG. 7). In other words, the inclination angle (angle Al) of the inclined portion 212 is identical to the inclination angle of the inclined portion 112 of the main frame 21R. A front/back direction length L2 of the inclined portion 212 is configured to be shorter than the front/back direction length L1 of the inclined portion 112 of the main frame 21R (see FIG. 7).

The rear plate-shaped portion 213 forms a rear portion of the fixing frame 210. The rear plate-shaped portion 213 is formed so as to extend rearward from a rear end of the inclined portion 212. In other words, the rear plate-shaped portion 213 is formed so as to be generally perpendicular to the left/right direction (parallel to the front plate-shaped portion 211). A midway portion in the front/back direction of the rear plate-shaped portion 213 (area near the front end) is formed so as to project upward in a side view. A front/back direction length of the rear plate-shaped portion 213 is configured to be slightly longer than the front/back direction length of the rear plate-shaped portion 113 of the main frame 21R.

The front plate-shaped portion 211, the inclined portion 212, and the rear plate-shaped portion 213 are integrally formed by appropriately bending a single sheet of a plate material. The inclined portion 212 is inclined with respect to the front/back direction, and therefore the rear plate-shaped portion 213 is arranged at a position shifted outward (to the left) by a width W2 with respect to the front plate-shaped portion 211 (see FIG. 7). The front/back direction length L2 of the inclined portion 212 is configured to be shorter than the front/back direction length L1 of the inclined portion 112 of the main frame 21R, and therefore the width W2 is smaller than the width W1.

The forward group of through-holes 214 is provided with a plurality of front through-holes 214a. The front through-holes 214a are circular holes formed so as to pass through the fixing frame 210 in the left/right direction. Five of the front through-holes 214a are formed at an appropriate interval from each other on a front portion of the fixing frame 210 (front plate-shaped portion 211). The front through-holes 214a are provided at positions left/right symmetrical to the front through-holes 114a on the main frame 21R. Bolts fixing the fixing frame 210 to the vehicle frame 2 are inserted through the front through-holes 214a.

The rear group of through-holes 215 is provided with a plurality of rear through-holes 215a. The rear through-holes 215a are circular holes formed so as to pass through the fixing frame 210 in the left/right direction. An inner diameter of the rear through-holes 215a is formed so as to be slightly smaller than the inner diameter of the front through-holes 214a. Five of the rear through-holes 215a are formed at an appropriate interval from each other on a rear portion of the fixing frame 210 (rear portion of the rear plate-shaped portion 213). Bolts fixing the fixing frame 210 to the transmission case 4 are inserted through the rear through-holes 215a.

A front/back direction length of the fixing frame 210 having this configuration is configured to be longer than the front/back direction length of the fixing frame 110 of the main frame 21R. In other words, as shown in FIG. 7, in a case where the front/back direction positions of a front end of the fixing frame 110 and a front end of the fixing frame 210 are aligned, a rear end of the fixing frame 110 is located forward of a rear end of the fixing frame 210.

Next, a method of assembling the front loader 20 with the vehicle body 1 via the main frames 21 having the above configuration is described with reference to FIGS. 9 and 10.

Figure 9:
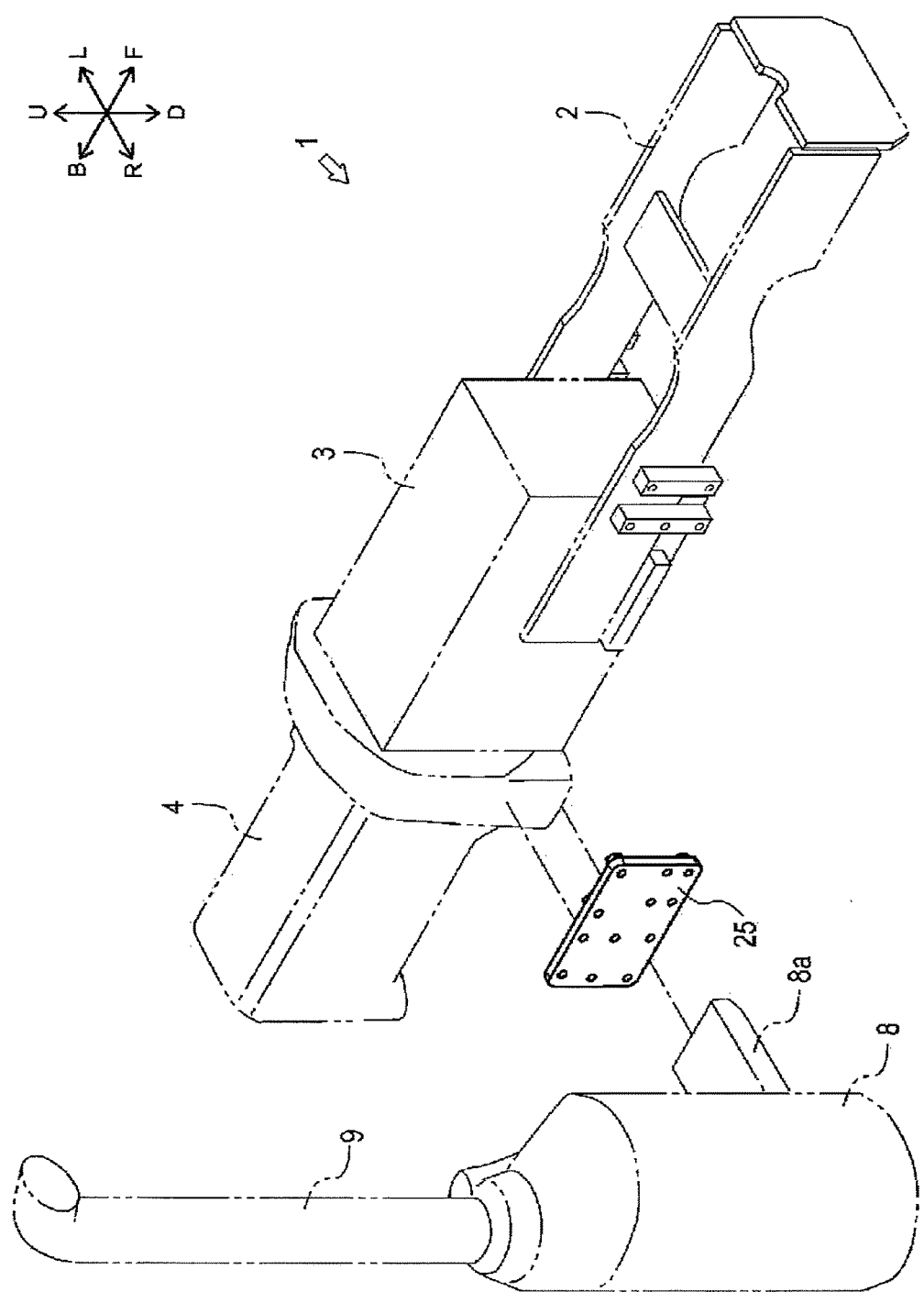
FIG. 9 is an exploded perspective view illustrating how an exemplary indirect frame is attached to a vehicle body.

First, as shown in FIG. 9, a rear portion of the indirect frame 25 is fixed to a right surface on a front portion of the transmission case 4. Accordingly, the indirect frame 25 is provided generally perpendicular to the left/right direction. A front portion of the indirect frame 25 is provided so as to extend forward past the transmission case 4 (beside the engine 3).

Next, the SCR 8 and the muffler 9 are fixed to the transmission case 4 from the right of the indirect frame 25. During this process, a bracket 8a formed so as to extend leftward from a bottom portion of the SCR 8 is fixed to a bottom surface of the transmission case 4.

Figure 10:
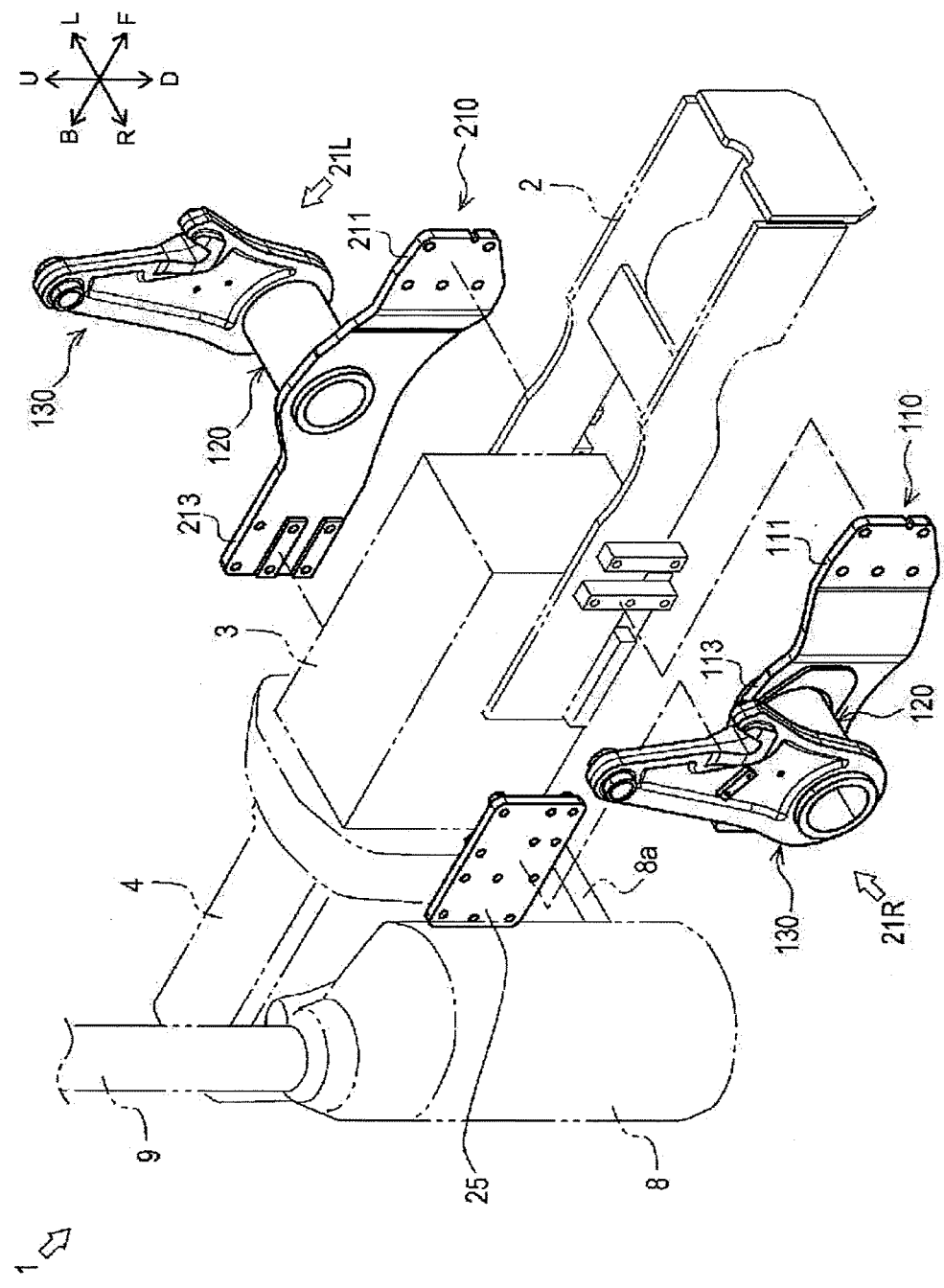
FIG. 10 is an exploded perspective view illustrating how the main frames are attached to the vehicle body.

Next, as shown in FIG. 10, the main frames 21 are fixed to the left and right of the vehicle body 1, respectively. Specifically, the front plate-shaped portion 211 of the left main frame 21L is brought into contact with a left lateral surface of the vehicle frame 2 and fixed thereto with bolts. In addition, the rear plate-shaped portion 213 is brought into contact with a left lateral surface of the transmission case 4 and is fixed thereto with bolts.

Also, the front plate-shaped portion 111 of the right main frame 21R is brought into contact with a right lateral surface of the vehicle frame 2 and fixed thereto with bolts. In addition, the rear plate-shaped portion 113 is brought into contact with a front portion of a right lateral surface of the indirect frame 25 and fixed thereto with bolts. When the rear plate-shaped portion 113 is brought into contact with the indirect frame 25, the main frame 21R can be readily positioned by inserting the stud bolt provided to the indirect frame 25 into the small-diameter through-hole 115b (see FIG. 6). A nut is tightened to the stud bolt from an exterior side (right side) of the main frame 21R.

In this way, the SCR 8 and the muffler 9 are provided to the right side of the vehicle body 1. However, the rear end of the right-side main frame 21R is positioned forward of the rear end of the left-side main frame 21L, which facilitates avoiding interference with the SCR 8 or the like during assembly. In addition, the rear group of through-holes 115 of the main frame 21R is arranged at a position lower than the forward group of through-holes 114 and the center C2 of the coupling frame 120, which facilitates avoiding interference with the SCR 8 or the like during the work of tightening the bolts of the rear group of through-holes 115, or the like.

Furthermore, the rear plate-shaped portion 113 of the right-side main frame 21R is shifted outward by the width W1 (a width greater than the width W2) relative to the front plate-shaped portion 111. Accordingly, a space in which the indirect frame 25 is arranged can be ensured between the main frame 21R and the transmission case 4.

Figure 4:
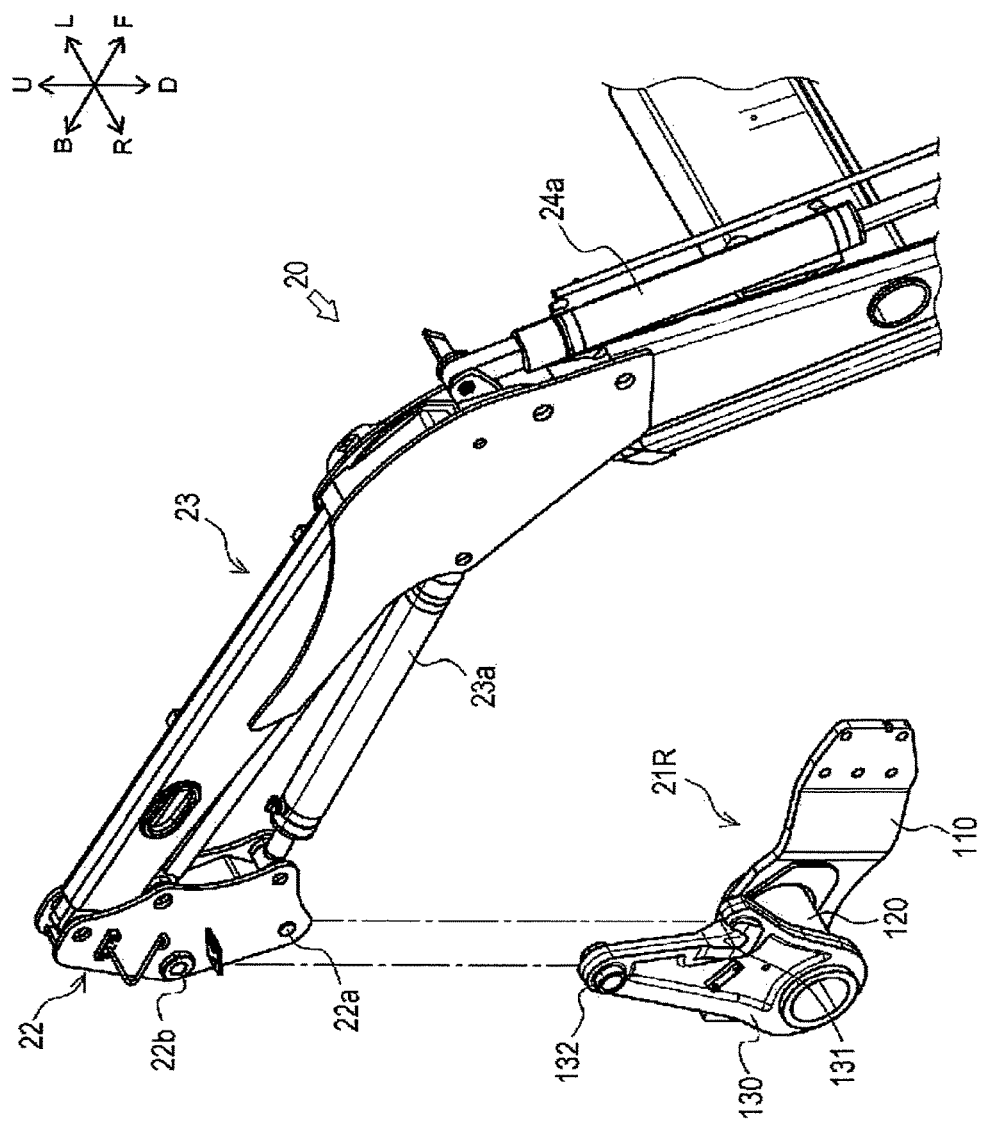
FIG. 4 is an exploded perspective view of the same.
Figure 5:
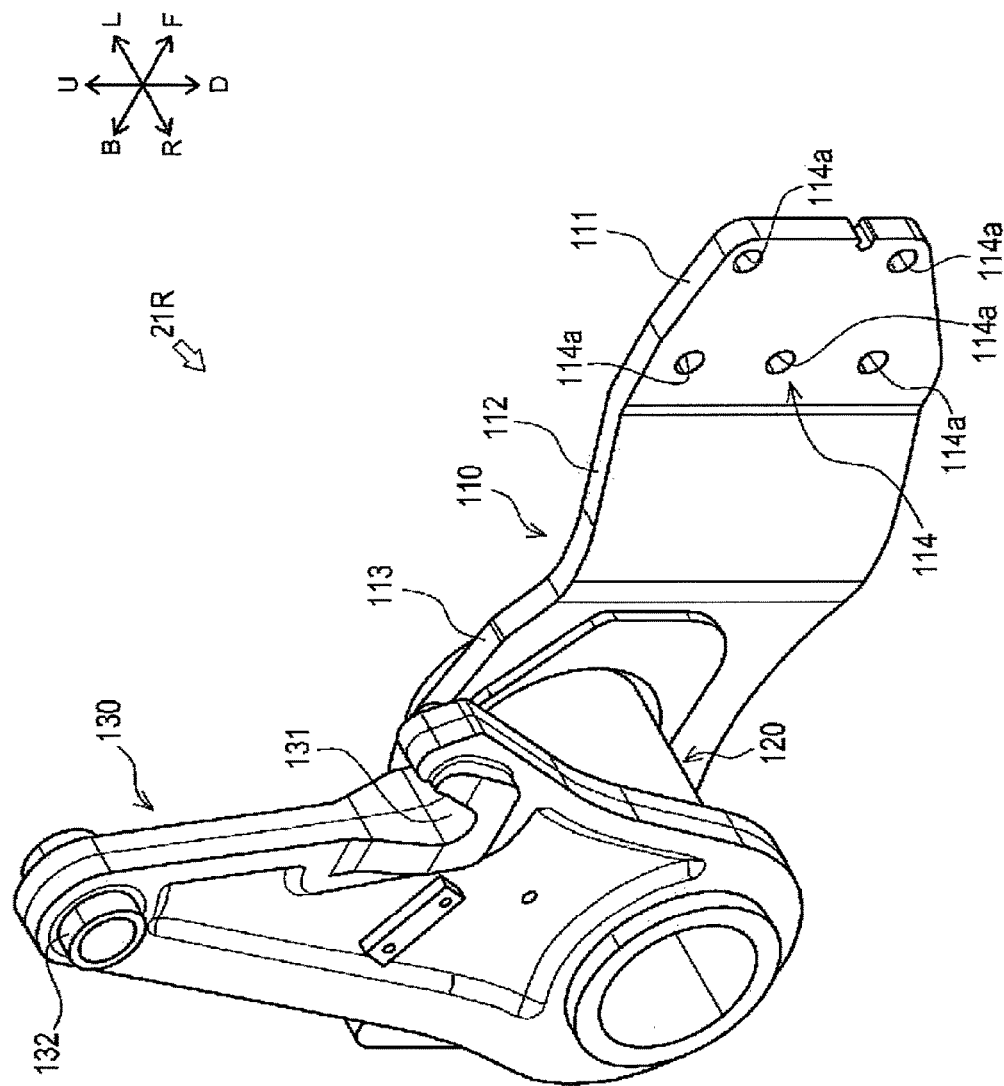
FIG. 5 is a perspective view of a main frame on a right side.

In this way, the booms 23 are supported via the brackets 22 on the main frames 21, which are attached to the vehicle body 1. Specifically, as shown in FIGS. 2 and 4, a support shaft 22a provided to a bottom portion of the bracket 22 is inserted into the support groove 131 of the support frame 130. In this state, the boss portion 22b provided to the midway portion in the vertical direction of the bracket 22 is adjusted so as to be positioned coaxially with the boss portion 132 of the support frame 130, and a pin (not shown in the drawings) is inserted through the boss portion 22b and the boss portion 132. Accordingly, the bracket 22 is coupled to the support frame 130.

The fixing frame 210 according to the present embodiment is an embodiment of a first fixing frame according to the present invention. The fixing frame 110 according to the present embodiment is an embodiment of a second fixing frame according to the present invention. The front plate-shaped portion 211 according to the present embodiment is an embodiment of a first front plate-shaped portion according to the present invention. The rear plate-shaped portion 213 according to the present embodiment is an embodiment of a first rear plate-shaped portion according to the present invention. The front plate-shaped portion 111 according to the present embodiment is an embodiment of a second front plate-shaped portion according to the present invention. The rear plate-shaped portion 113 according to the present embodiment is an embodiment of a second rear plate-shaped portion according to the present invention.

In the present embodiment, a midway portion in the front/back direction of the second rear plate-shaped portion is formed so as to project upward. Accordingly, interference with a member provided to the vehicle body can be avoided appropriately. In addition, the coupling frame can be provided at a higher position.

A plurality of the front through-holes are provided at intervals from each other on a front portion of the second fixing frame (second front plate-shaped portion). Specifically, five front through-holes are provided. Accordingly, the second fixing frame can be appropriately fixed to the vehicle body.

A plurality of the rear through-holes are provided at intervals from each other on a rear portion of the second fixing frame (second rear plate-shaped portion). Specifically, five rear through-holes are provided. Accordingly, the second fixing frame can be appropriately fixed to the vehicle body.

Also, the rear through-hole provided at the highest position among the plurality of rear through-holes is provided at a position lower than the front through-hole provided at the highest position among the plurality of front through-holes. Accordingly, interference with the coupling frame or the like is readily avoided and the work of tightening the bolts can be facilitated.

In addition, the rear through-hole provided at the lowest position among the plurality of rear through-holes is provided at a position lower than the front through-hole provided at the lowest position among the plurality of front through-holes. Accordingly, interference with the coupling frame or the like is readily avoided and the work of tightening the bolts can be facilitated.

The vertical direction range in which the rear group of through-holes is formed is situated at a position lower than the vertical direction range in which the forward group of through-holes is formed. Accordingly, interference with the coupling frame or the like is readily avoided and the work of tightening the bolts can be facilitated.

Also, a center of the rear through-hole provided at the highest position among the plurality of rear through-holes is provided at a position lower than the center of the coupling frame. Accordingly, interference with the coupling frame or the like is readily avoided and the work of tightening the bolts can be facilitated.

Moreover, a front/back direction length of the first front plate-shaped portion is configured to be longer than the front/back direction length of the second front plate-shaped portion. Accordingly, even in a case where the vehicle body is configured to be left/right-direction asymmetrical, the first fixing frame and the second fixing frame can be appropriately fixed to the vehicle body.

A front/back direction length of the first rear plate-shaped portion is configured to be longer than the front/back direction length of the second rear plate-shaped portion. Accordingly, even in a case where the vehicle body is configured to be left/right-direction asymmetrical, the first fixing frame and the second fixing frame can be appropriately fixed to the vehicle body.

In addition, the first fixing frame is formed such that the first front plate-shaped portion couples with the first rear plate-shaped portion, and is provided with a first inclined portion (inclined portion 212), which is shaped so as to incline by a first predetermined angle (angle A1) with respect to the front/back direction. The second fixing frame is formed such that the second front plate-shaped portion couples with the second rear plate-shaped portion, and is provided with a second inclined portion (inclined portion 112), which is shaped so as to incline by the first predetermined angle with respect to the front/back direction. Accordingly, an inclination angle of the first inclined portion and the second inclined portion can be made uniform, and the first fixing frame and the second fixing frame can be readily manufactured.

Also, the front/back direction length of the second inclined portion is configured to be longer than the front/back direction length of the first inclined portion. Accordingly, an amount of outward displacement of the second rear plate-shaped portion relative to the second front plate-shaped portion can be made larger than the amount of outward displacement of the first rear plate-shaped portion relative to the first front plate-shaped portion. Therefore, a space in which other members are arranged can be ensured between the second rear plate-shaped portion and the vehicle body.

Also, the front/back direction length of the first fixing frame is configured to be longer than the front/back direction length of the second fixing frame. Accordingly, even in a case where the vehicle body is configured to be left/right-direction asymmetrical, the first fixing frame and the second fixing frame can be appropriately fixed to the vehicle body.

Figure 11:
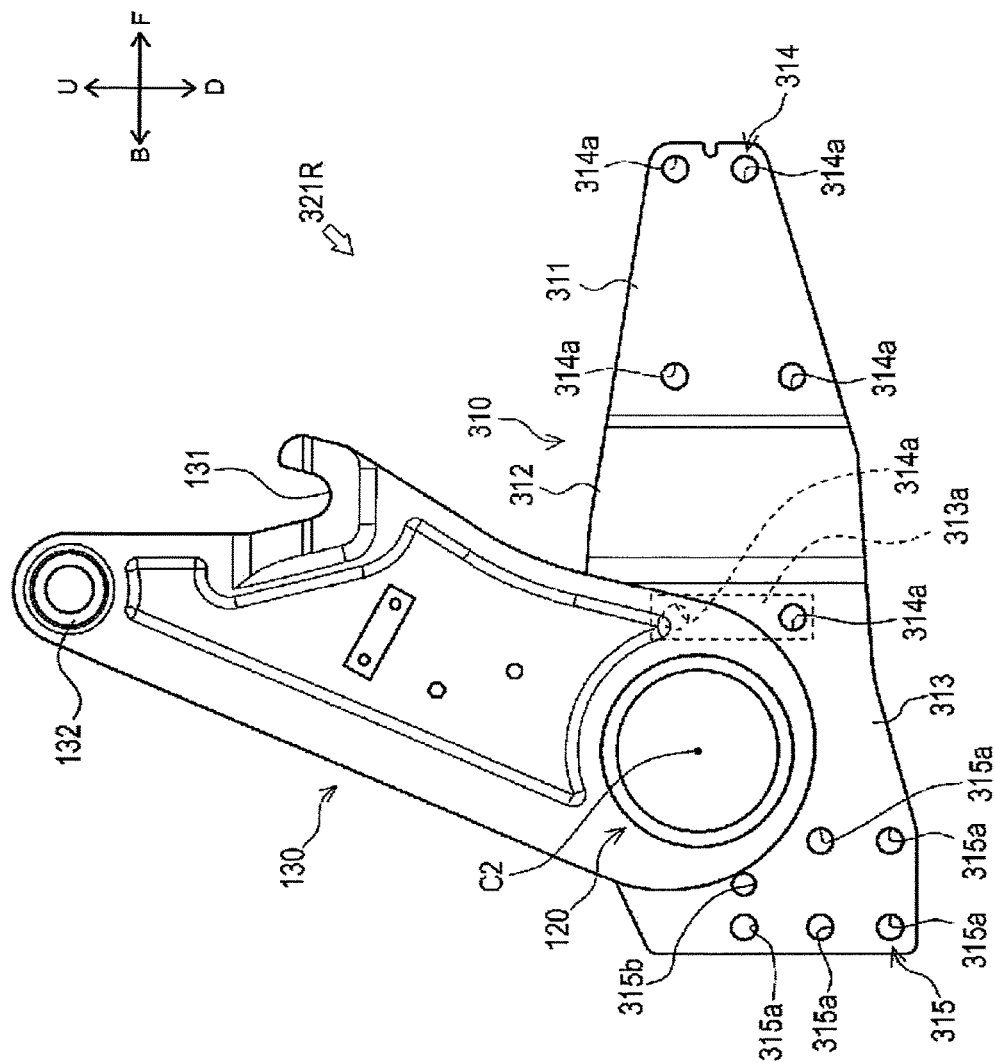
FIG. 11 is a side view of a main frame on the right side according to a second embodiment.

In the following, a main frame 321R and a main frame 321L according to a second embodiment are described. First, a configuration of the main frame 321R, which is provided on the right side, is described with reference to FIGS. 11 and 12.

The main frame 321R is primarily equipped with a fixing frame 310, the coupling frame 120, and the support frame 130. Because the coupling frame 120 and the support frame 130 of the main frame 321R are identical to the coupling frame 120 and the support frame 130 of the main frame 21R according to the first embodiment, descriptions thereof are omitted.

The fixing frame 310 is fixed to the vehicle body 1. The fixing frame 310 is primarily equipped with a front plate-shaped portion 311, an inclined portion 312, a rear plate-shaped portion 313, a forward group of through-holes 314, and a rear group of through-holes 315. The configurations of the front plate-shaped portion 311, the inclined portion 312, the rear plate-shaped portion 313, the forward group of through-holes 314, and the rear group of through-holes 315 are similar to the configurations of, respectively, the front plate-shaped portion 111, the inclined portion 112, the rear plate-shaped portion 113, the forward group of through-holes 114, and the rear group of through-holes 115 according to the first embodiment. Accordingly, only differences from the first embodiment are described below.

The inclined portion 312 is formed in a plate shape extending to the right and rearward from a rear end of the front plate-shaped portion 311. The inclined portion 312 is formed so as to incline by a predetermined angle A2 with respect to the front/back direction (see FIG. 12).

The rear plate-shaped portion 313 is formed so as to extend rearward from a rear end of the inclined portion 312. An area proximate to a rear end of the rear plate-shaped portion 313 is formed so as to be provided in a lower position than an area proximate to a front end of the rear plate-shaped portion 313.

Figure 12:
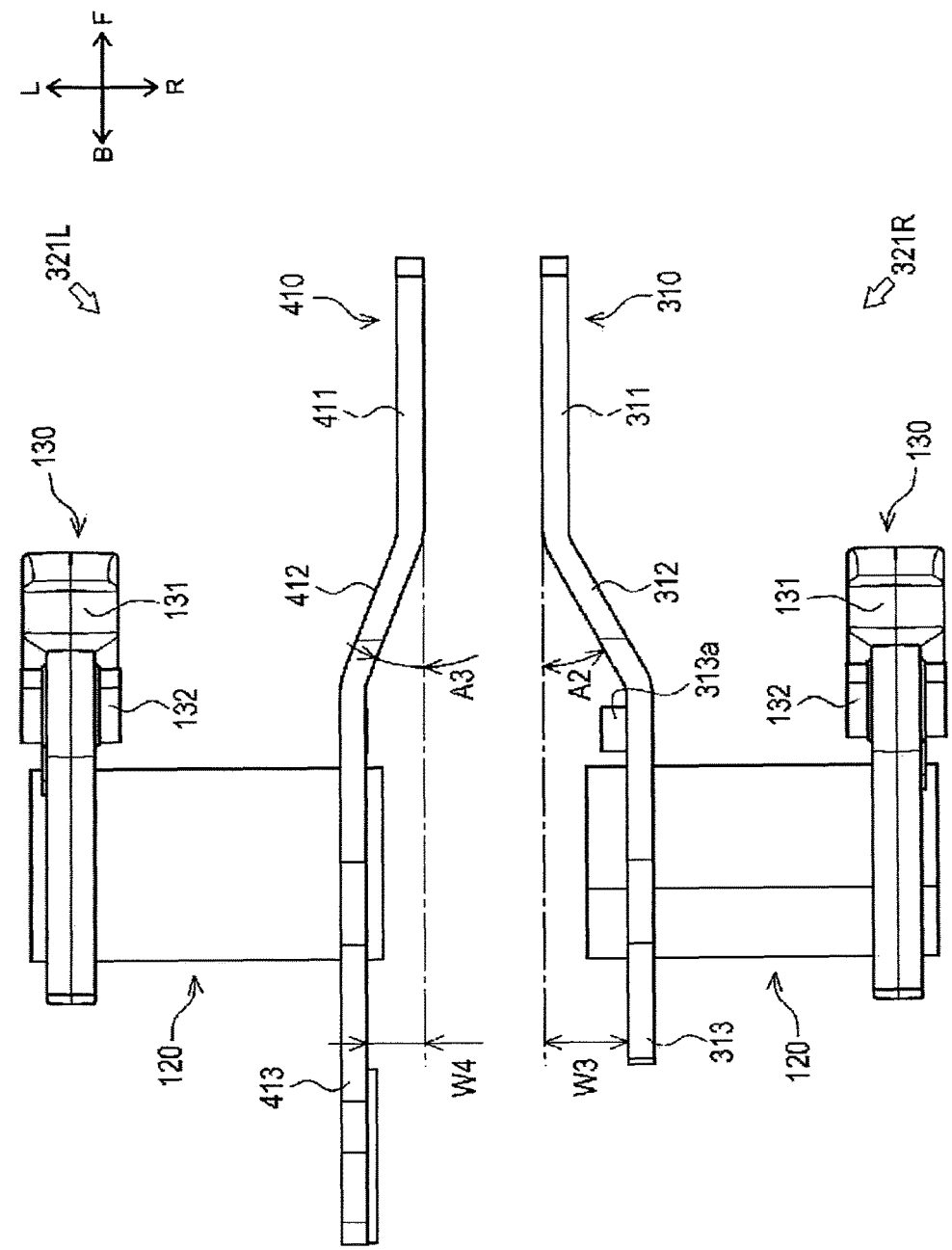
FIG. 12 is a plan view of left and right main frames according to the second embodiment.

The inclined portion 312 is inclined with respect to the front/back direction, and therefore the rear plate-shaped portion 313 is arranged at a position shifted outward (to the right) by a width W3 with respect to the front plate-shaped portion 311 (see FIG. 12).

The forward group of through-holes 314 is provided with a plurality of front through-holes 314a. Six of the front through-holes 314a are formed at an appropriate interval from each other, arranged across the fixing frame 310 from an area proximate to a front end portion to a midway portion in the front/back direction (spanning the front plate-shaped portion 311 and the rear plate-shaped portion 313). Specifically, four of the front through-holes 314a are provided to the front plate-shaped portion 311 and two of the front through-holes 314a are provided to the area proximate to the front end portion of the rear plate-shaped portion 313 (forward of the coupling frame 120). A plate member 313a formed in substantially a rectangular shape in a lateral view is fixed by welding or the like to a portion on a left lateral surface of the rear plate-shaped portion 313 corresponding to the front through-holes 314a. The front through-holes 314a are provided so as to pass through the plate member 313a.

The rear group of through-holes 315 is provided with a plurality of rear through-holes 315a and a small-diameter through-hole 315b, similar to the first embodiment.

The rear group of through-holes 315 on the main frame 321R, which is configured as noted above, is provided at a position lower than the forward group of through-holes 314. In other words, a range in which the rear group of through-holes 315 is formed (vertical direction range) is situated at a position lower than the range in which the forward group of through-holes 314 is formed. Moreover, the rear group of through-holes 315 is provided at a position lower than the center (vertical direction center) of the coupling frame 120.

Figure 13:
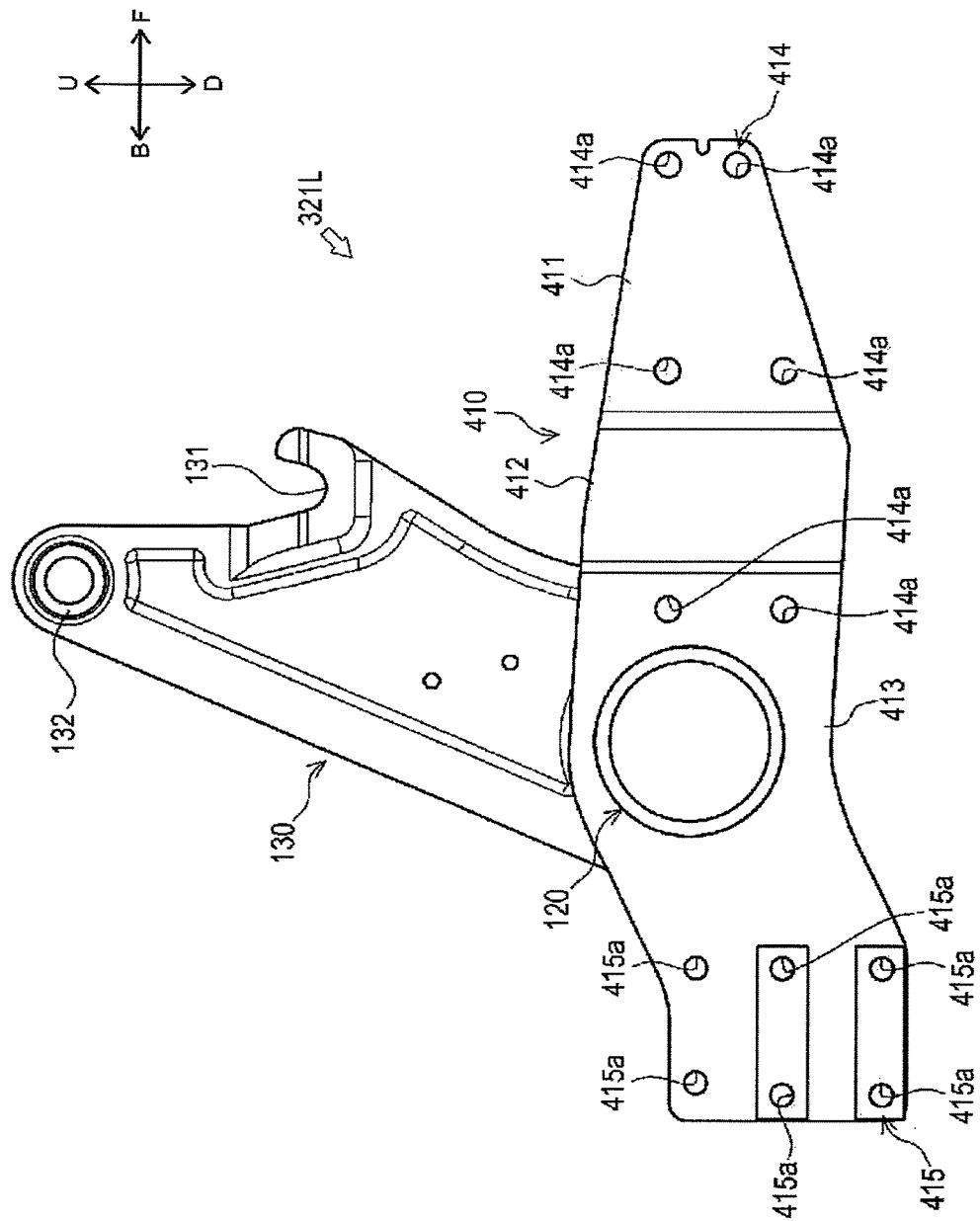
FIG. 13 is a side view of the main frame on the left side according to the second embodiment.

Next, a configuration of the main frame 321L, which is provided on the left side, is described with reference to FIGS. 12 and 13.

The main frame 321L is primarily equipped with a fixing frame 410, the coupling frame 120, and the support frame 130. Because the coupling frame 120 and the support frame 130 of the main frame 321L are left/right symmetrical to the coupling frame 120 and the support frame 130 of the main frame 321R, descriptions thereof are omitted.

The fixing frame 410 is fixed to the vehicle body 1. The fixing frame 410 is primarily equipped with a front plate-shaped portion 411, an inclined portion 412, a rear plate-shaped portion 413, a forward group of through-holes 414, and a rear group of through-holes 415. The configurations of the front plate-shaped portion 411, the inclined portion 412, the rear plate-shaped portion 413, the forward group of through-holes 414, and the rear group of through-holes 415 are similar to the configurations of, respectively, the front plate-shaped portion 211, the inclined portion 212, the rear plate-shaped portion 213, the forward group of through-holes 214, and the rear group of through-holes 215 according to the first embodiment. Accordingly, only differences from the first embodiment are described below.

A front/back direction length of the front plate-shaped portion 411 is configured to be substantially identical to the front/back direction length of the front plate-shaped portion 311 of the main frame 321R.

The inclined portion 412 is formed in a plate shape extending to the left and rearward from a rear end of the front plate-shaped portion 411. The inclined portion 412 is formed so as to incline by a predetermined angle A3 with respect to the front/back direction (see FIG. 12). An inclination angle (angle A3) of the inclined portion 412 is configured to be smaller than the inclination angle (angle A2) of the inclined portion 312 of the main frame 321R. A front/back direction length of the inclined portion 412 is configured to be substantially identical to the front/back direction length of the inclined portion 312 of the main frame 321R (see FIG. 12).

The rear plate-shaped portion 413 is formed so as to extend rearward from a rear end of the inclined portion 412. An area proximate to a rear end of the rear plate-shaped portion 413 is formed so as to be provided in a lower position than an area proximate to a front end of the rear plate-shaped portion 413.

The inclined portion 412 is inclined with respect to the front/back direction, and therefore the rear plate-shaped portion 413 is arranged at a position shifted outward (to the left) by a width W4 with respect to the front plate-shaped portion 411 (see FIG. 12). The inclination angle (angle A3) of the inclined portion 412 is smaller than the inclination angle (angle A2) of the inclined portion 312 of the main frame 321R, and therefore the width W4 is smaller than the width W3.

The forward group of through-holes 414 is provided with a plurality of front through-holes 414a. Six of the front through-holes 414a are formed at an appropriate interval from each other, arranged across the fixing frame 410 from an area proximate to a front end portion to a midway portion in the front/back direction (spanning the front plate-shaped portion 411 and the rear plate-shaped portion 413). The front through-holes 414a are provided at positions left/right symmetrical to the front through-holes 314a on the main frame 321R.

The rear group of through-holes 415 is provided with a plurality of rear through-holes 415a. Six of the rear through-holes 415a are formed at an appropriate interval from each other on a rear portion of the fixing frame 410 (rear portion of the rear plate-shaped portion 413).

A front/back direction length of the fixing frame 410 having this configuration is configured to be longer than the front/back direction length of the fixing frame 310 of the main frame 321R.

Figure 14:
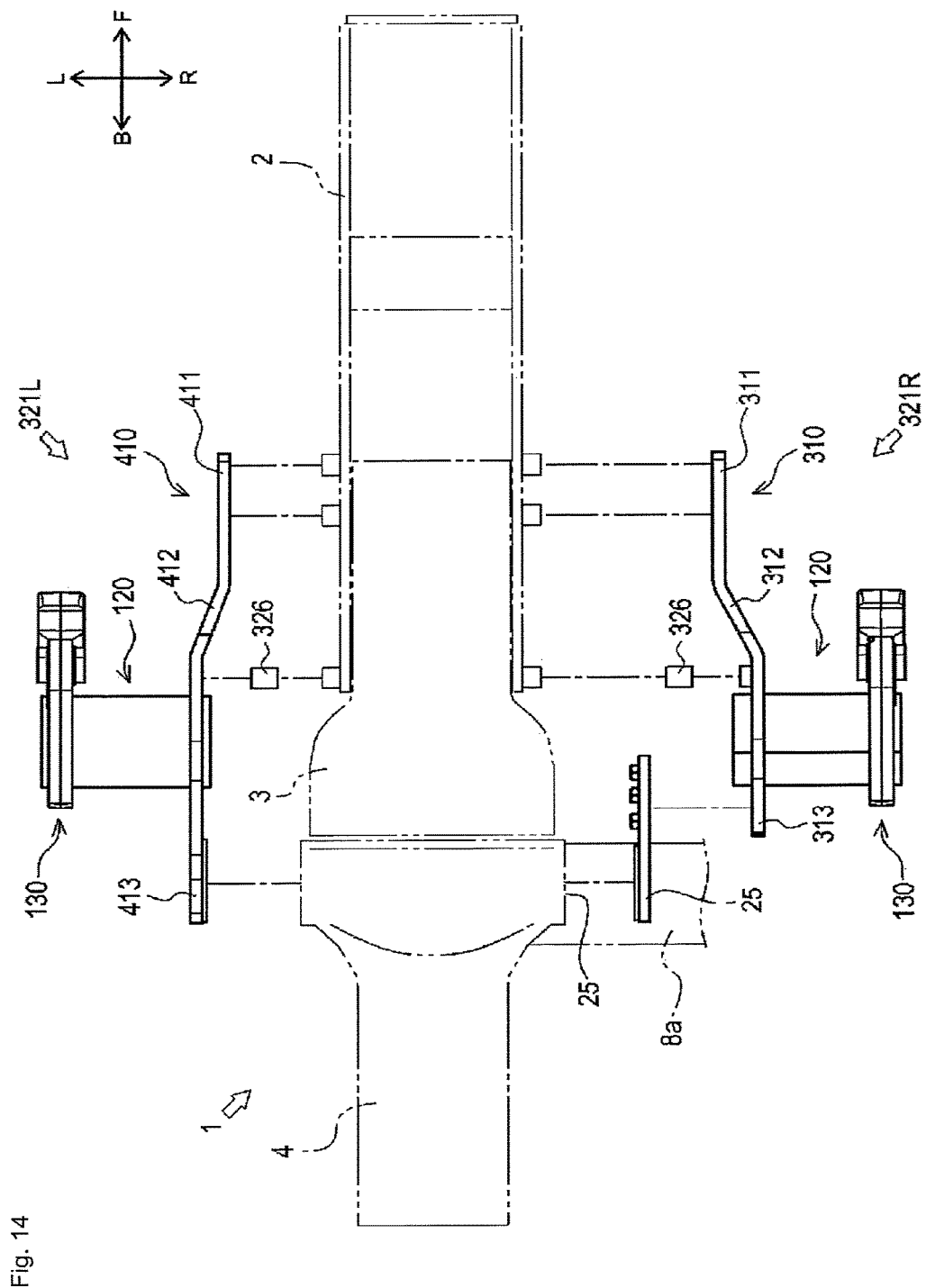
FIG. 14 is an exploded plan view illustrating how the main frames according to the second embodiment are attached to the vehicle body.

Next, a method of assembling the main frame 321R and the main frame 321L having the above configuration with the vehicle body 1 is described with reference to FIG. 14.

First, similar to the first embodiment, the rear portion of the indirect frame 25 is fixed to the right lateral surface on the front portion of the transmission case 4. Accordingly, the indirect frame 25 is provided generally perpendicular to the left/right direction. The front portion of the indirect frame 25 is provided so as to extend forward past the transmission case 4 (beside the engine 3).

Next, similar to the first embodiment, the SCR 8 and the muffler 9 are fixed, via the bracket 8a, to the transmission case 4 from the right of the indirect frame 25.

Next, the main frames 321R and 321L are fixed to the left and right of the vehicle body 1, respectively. Specifically, the front plate-shaped portion 411 of the left main frame 321L is brought into contact with the left lateral surface of the vehicle frame 2 and fixed thereto with bolts. During this process, the rear plate-shaped portion 413 (front through-holes 414a formed on the rear plate-shaped portion 413 (see FIG. 13)) and the vehicle frame 2 separate. Therefore, a parallelepiped-shaped spacer 326 filling this gap is placed between the rear plate-shaped portion 413 and the vehicle frame 2 (portion corresponding to the front through-holes 414a).

Also, the front plate-shaped portion 311 of the right main frame 321R is brought into contact with the right lateral surface of the vehicle frame 2 and fixed thereto with bolts. In addition, the rear plate-shaped portion 313 is brought into contact with the front portion of the right lateral surface of the indirect frame 25 and fixed thereto with bolts. During this process, the rear plate-shaped portion 313 (front through-holes 314a formed on the rear plate-shaped portion 313 (see FIG. 11)) and the vehicle frame 2 separate. Therefore, the parallelepiped-shaped spacer 326 filling this gap is placed between the rear plate-shaped portion 313 and the vehicle frame 2 (portion corresponding to the front through-holes 314a).

The spacer 326 according to the present embodiment is an embodiment of an indirect member according to the present invention.

In the present embodiment, an area proximate to a rear end portion of the second rear plate-shaped portion is formed so as to be provided in a lower position than an area proximate to a front end of the second rear plate-shaped portion. Accordingly, interference with a member provided to the vehicle body can be avoided appropriately.

In addition, the front through-holes are formed on each of the second front plate-shaped portion and the second rear plate-shaped portion. Specifically, four of the front through-holes are provided to the second front plate-shaped portion and two of the front through-holes are provided to an area proximate to a front end portion of the second rear plate-shaped portion (forward of the coupling frame). Accordingly, the second fixing frame can be appropriately fixed to the vehicle body.

In addition, the first fixing frame is formed such that the first front plate-shaped portion couples with the first rear plate-shaped portion, and is provided with the first inclined portion (inclined portion 412), which is shaped so as to incline by a second predetermined angle (angle A3) with respect to the front/back direction. The second fixing frame is formed such that the second front plate-shaped portion couples with the second rear plate-shaped portion, and is provided with the second inclined portion (inclined portion 312), which is shaped so as to incline by a third predetermined angle (angle A2) with respect to the front/back direction and is formed to have substantially an identical front/back direction length to the first inclined portion. Accordingly, the front/back direction length of the first inclined portion and the second inclined portion can be made uniform, and the first fixing frame and the second fixing frame can be readily manufactured.

Also, the second predetermined angle (angle A3) is configured to be smaller than the third predetermined angle (angle A2). Accordingly, an amount of outward displacement of the second rear plate-shaped portion relative to the second front plate-shaped portion can be made larger than the amount of outward displacement of the first rear plate-shaped portion relative to the first front plate-shaped portion.

Above, embodiments of the present invention were described, but the present invention is not limited to the above-noted configurations. Various modifications are possible within a scope of the invention described in the claims.

For example, in the embodiments described above, a tractor is given as an example of a work vehicle to which the front loader 20 is provided; however, the present invention is not limited to this. In other words, a configuration of a tractor to which the front loader 20 is provided is not limited to the tractor according to the present embodiments. The work vehicle to which the front loader 20 is provided may be other agricultural vehicles, construction vehicles, and industrial vehicles.

In addition, the configuration of the front loader is not limited to the embodiments above, and appropriate modifications can be made to the shape, size, and the like of various components.

In the embodiments above, the rear end of the main frame provided to the right side of the vehicle body 1 (for example, the main frame 21R (see FIG. 7)) is formed so as to be positioned further forward than the rear end of the main frame provided to the left side of the vehicle body 1 (for example, the main frame 21L). However, the present invention is not limited to this. In other words, the rear end of the main frame provided to the left side of the vehicle body 1 may also be formed so as to be positioned further forward than the rear end of the main frame provided to the right side of the vehicle body 1.

In addition, the number and position of through-holes through which the bolts (stud bolts) are inserted (for example, the front through-holes 114a (see FIG. 6)) can be modified as appropriate. For example, so long as strength can be ensured, the number of through-holes can also be reduced.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A two-boom front loader for a vehicle having a vehicle body and a transmission case, comprising:
   a first fixing frame configured to mount a first side boom of the two-boom front loader, said first fixing frame being fixed to a first side of the vehicle body;
   a second fixing frame configured to mount a second side boom of the two-boom front loader, said first fixing frame being fixed to a second and opposite side of the vehicle body; and
   said first and second fixing frames being spaced apart so as to be located on opposite sides of the transmission case,
   wherein a rear end of the second fixing frame is positioned further forward than a rear end of the first fixing frame.

2. The front loader of claim 1, further comprising:
   a first support frame configured to support the first side boom;
   said first support frame being located on an exterior side of the first fixing frame; and
   a first coupling frame coupling the first fixing frame to the first support frame,
   wherein the first fixing frame comprises:
      a forward group of through-holes located forward of the coupling frame and being configured to receive bolts adapted to fix the first fixing frame to the vehicle body; and
      a rear group of through-holes located rearward of the coupling frame and in a lower position than the forward group of through-holes, the rear group of through-holes configured to receive bolts adapted to fix the first fixing frame to the vehicle body.

3. The front loader of claim 1, further comprising:
   a second support frame configured to support the second side boom;
   said second support frame being located on an exterior side of the second fixing frame; and
   a second coupling frame coupling the second fixing frame to the second support frame, wherein the second fixing frame comprises:
      a forward group of through-holes located forward of the second coupling frame and being configured to receive bolts adapted to fix the second fixing frame to the vehicle body; and
      a rear group of through-holes located rearward of the second coupling frame and in a lower position than the forward group of through-holes, the rear group of through-holes configured to receive bolts adapted to fix the second fixing frame to the vehicle body.

4. The front loader of claim 3, wherein the rear group of through-holes is located at a position lower than a vertical direction center axis of the second coupling frame.

5. The front loader according to claim 3, wherein the rear group of through-holes includes a smaller-diameter through-hole having a diameter smaller than other of the rear through-holes and being located at a position higher than at least one of the other rear through-holes and forward of at least one of the other rear through-holes, said smaller-diameter through-hole being configured to receive therein a stud bolt adapted to fix the second fixing frame to the vehicle body.

6. The front loader of claim 5, wherein the rear group of through-holes is located at a position lower than a vertical direction center axis of the second coupling frame.

7. The front loader of claim 1, wherein the first fixing frame comprises:
   a front plate-shaped portion having a surface oriented generally perpendicular to a left/right direction of the vehicle body; and
   a rear plate-shaped portion located rearward of the front plate-shaped portion and having a surface oriented generally perpendicular to the left/right direction,
   wherein the rear plate-shaped portion is shifted further outward than the front plate-shaped portion by a first predetermined width.

8. The front loader of claim 1, wherein the second fixing frame comprises:
   a front plate-shaped portion having a surface oriented generally perpendicular to a left/right direction of the vehicle body; and
   a rear plate-shaped portion located rearward of the front plate-shaped portion and having a surface oriented generally perpendicular to the left/right direction,
   wherein the rear plate-shaped portion is shifted further outward than the front plate-shaped portion by a first predetermined width.

9. The front loader of claim 1, wherein:
   the first fixing frame comprises:
      a front plate-shaped portion having a surface oriented generally perpendicular to a left/right direction of the vehicle body; and
      a rear plate-shaped portion located rearward of the front plate-shaped portion and having a surface oriented generally perpendicular to the left/right direction,
      wherein the rear plate-shaped portion is shifted further outward than the front plate-shaped portion by a first predetermined width; and
   the second fixing frame comprises:
      a front plate-shaped portion having a surface oriented generally perpendicular to a left/right direction of the vehicle body; and
      a rear plate-shaped portion located rearward of the front plate-shaped portion and having a surface oriented generally perpendicular to the left/right direction,
      wherein the rear plate-shaped portion is shifted further outward than the front plate-shaped portion by a second predetermined width that is greater than the first predetermined width.

10. The front loader of claim 1, further comprising an indirect frame member configured to connect the rear end of the second fixing frame to one of:
    the transmission case; and
    the vehicle body.

11. The front loader of claim 10, wherein an overall length of the first fixing frame is different than an overall length of the second fixing frame, each overall length being measured between a front end and the rear end of each of the first and second fixing frames.

12. The front loader of claim 1, wherein:
a front portion of the second fixing frame is fixed to the second side of the vehicle body;
the rear end of the second fixing frame is laterally offset in a left-right direction of the vehicle body relative to the front portion of the second fixing frame; and
a boom support frame is fixed to the second fixing frame via a coupling frame.

13. The front loader of claim 12, further comprising an indirect frame member configured to connect the rear end of the second fixing frame to one of:
the transmission case; and
the vehicle body.

14. The front loader of claim 13, wherein:
a front portion of the first fixing frame is fixed to the first side of the vehicle body;
the rear end of the first fixing frame is laterally offset in a left-right direction of the vehicle body relative to the front portion of the first fixing frame; and
a boom support frame is fixed to the first fixing frame via a coupling frame.

15. The front loader of claim 1, wherein an overall length of the first fixing frame is greater than an overall length of the second fixing frame, each overall length being measured between a front end and the rear end of each of the first and second fixing frames.

* * * * *